May 4, 1937. LE ROY H. HOFFER Re. 20,348

WELDING MACHINE

Original Filed Jan. 28, 1932 7 Sheets-Sheet 1

INVENTOR
LE ROY H. HOFFER

ATTORNEY
Ulmar Rauber

May 4, 1937. LE ROY H. HOFFER Re. 20,348

WELDING MACHINE

Original Filed Jan. 28, 1932 7 Sheets-Sheet 2

INVENTOR

LeRoy H. Hoffer

ATTORNEY

Wina & Rauber

May 4, 1937. LE ROY H. HOFFER Re. 20,348

WELDING MACHINE

Original Filed Jan. 28, 1932 7 Sheets-Sheet 3

INVENTOR
LE ROY H. HOFFER
ATTORNEY
Usina & Rauber

May 4, 1937. LE ROY H. HOFFER Re. 20,348

WELDING MACHINE

Original Filed Jan. 28, 1932 7 Sheets-Sheet 4

INVENTOR

LE ROY H. HOFFER

ATTORNEY

Ulma & Rauber

May 4, 1937. LE ROY H. HOFFER Re. 20,348

WELDING MACHINE

Original Filed Jan. 28, 1932 7 Sheets-Sheet 5

INVENTOR
LE ROY H. HOFFER
ATTORNEY
Ulmar Rauber

May 4, 1937. LE ROY H. HOFFER Re. 20,348

WELDING MACHINE

Original Filed Jan. 28, 1932 7 Sheets-Sheet 6

INVENTOR

LE ROY H. HOFFER

ATTORNEY

Ulmar Rauber

May 4, 1937. LE ROY H. HOFFER Re. 20,348
WELDING MACHINE
Original Filed Jan. 28, 1932 7 Sheets-Sheet 7
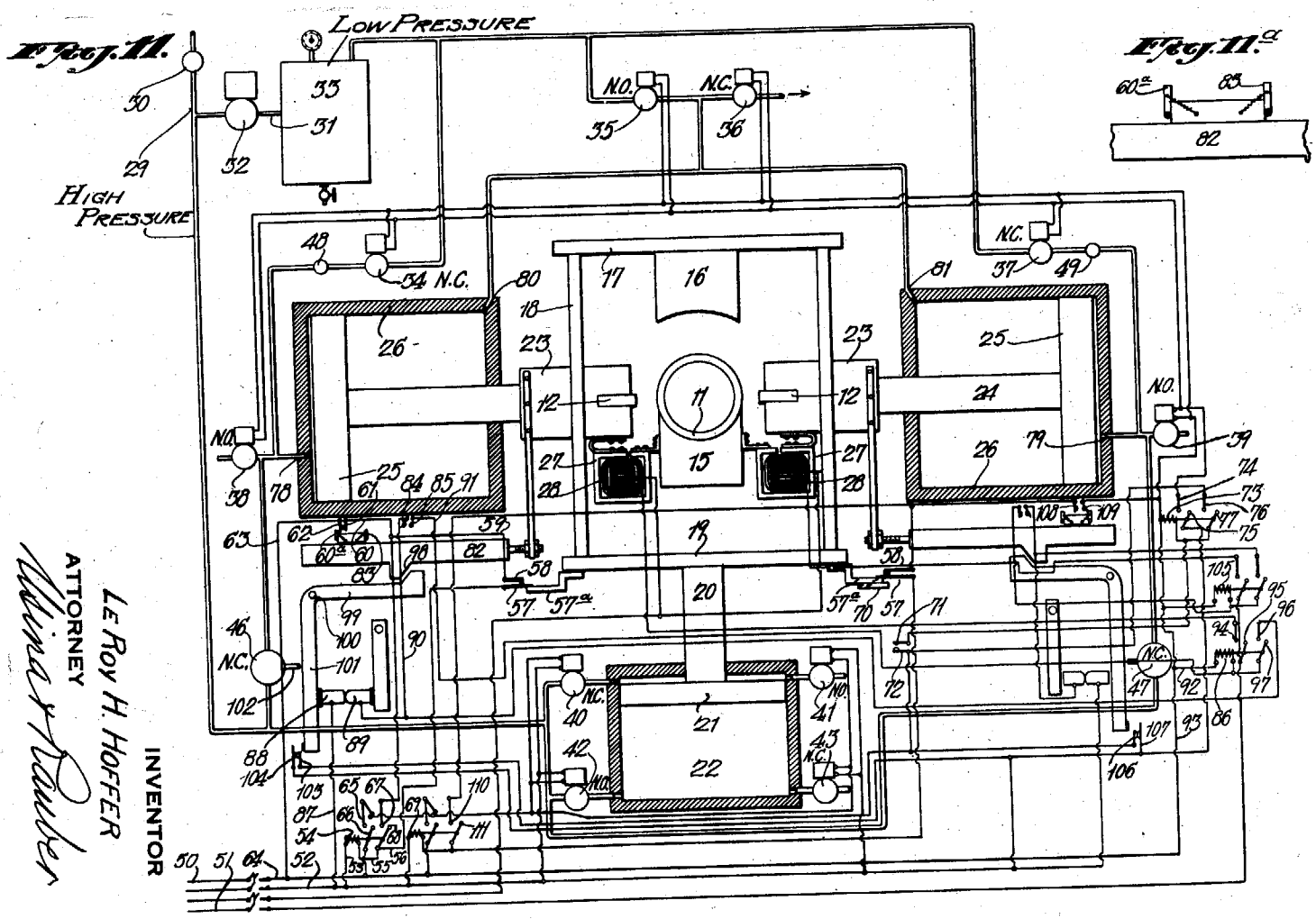
INVENTOR
LE ROY H. HOFFER
ATTORNEY
Wilmar Rauber Reissued May 4, 1937

Re. 20,348

UNITED STATES PATENT OFFICE 20,348

WELDING MACHINE

Le Roy H. Hoffer, Brooklyn, N. Y., assignor to Metropolitan Engineering Company, Brooklyn, N. Y., a corporation of New York Original No. 1,968,079, dated July 31, 1934, Serial No. 589,347, January 28, 1932. Application for reissue July 18, 1936, Serial No. 91,436

8 Claims. (Cl. 219—4)

The invention provides a machine which is adapted to work rapidly and economically in applying a succession of resistance welding operations to a base member or work piece.

The accompanying drawings illustrate a machine embodying the invention and designed specifically for welding a succession of pins or short fins to a boiler tube in two rows extending lengthwise and located at the opposite sides of the tube. The invention is applicable, however, to the welding of a succession of fins at one side only, and generally to the welding of a succession of similar attachments to various other products.

Figure 1:
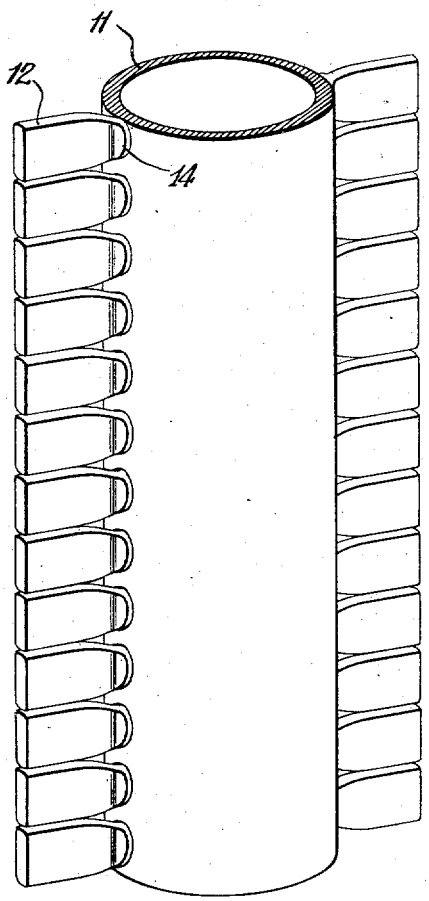
Figure 7:
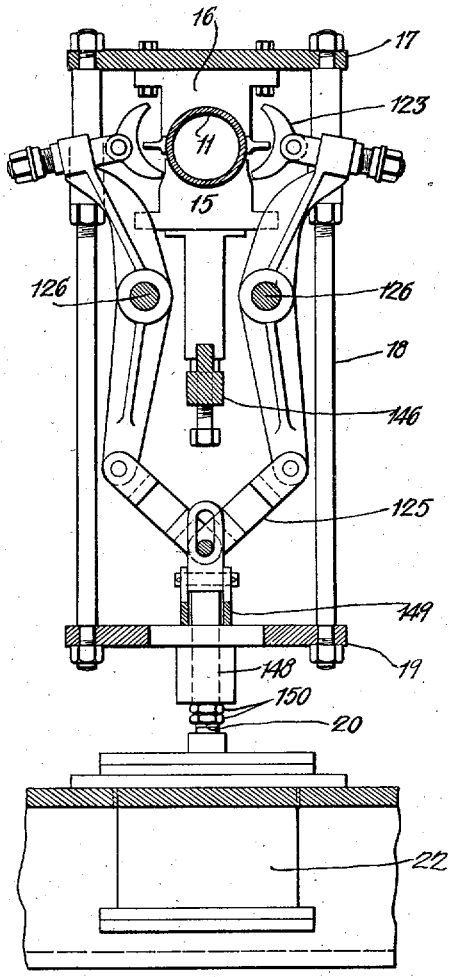
Figures 2, 3:
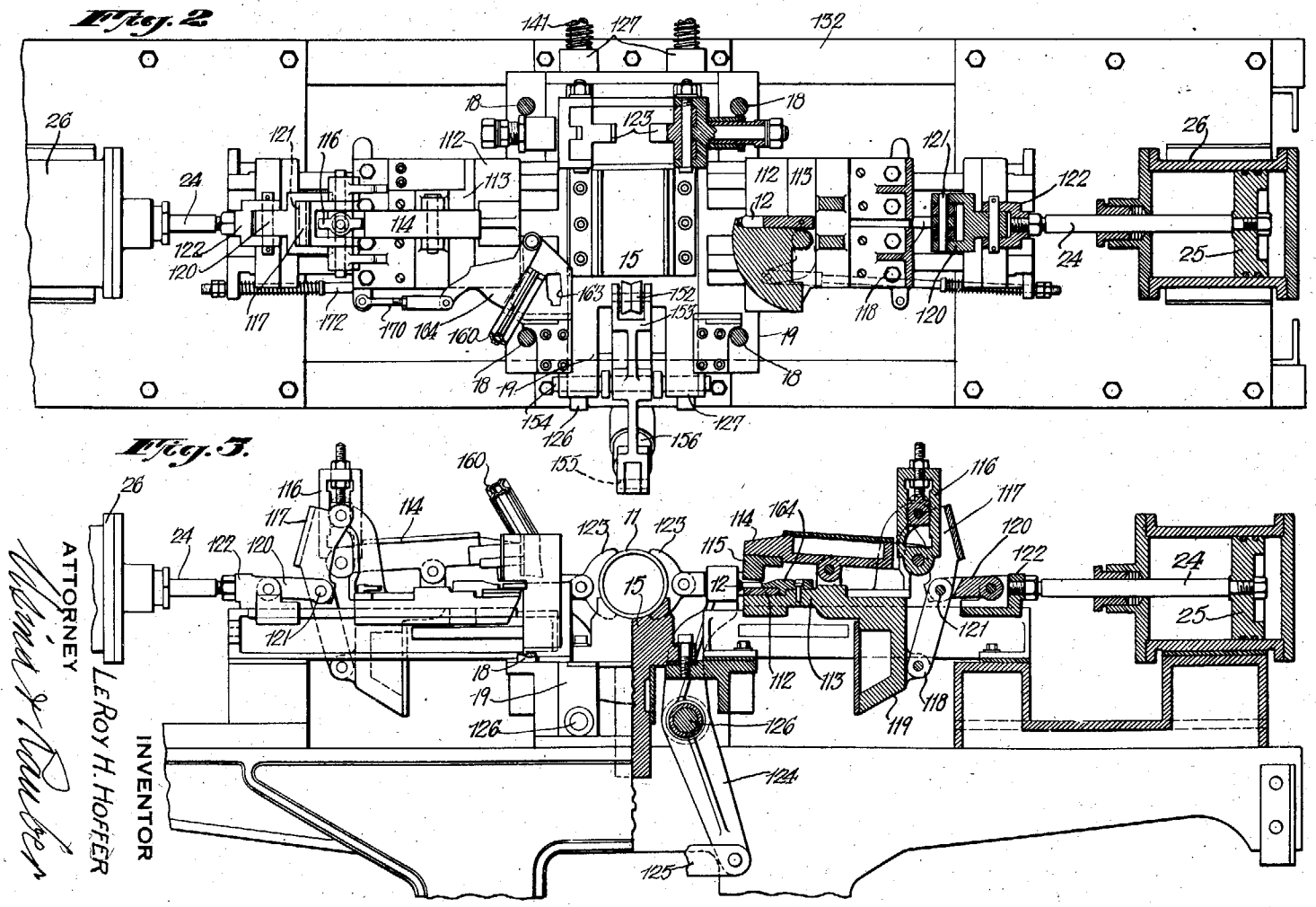
Figure 4:
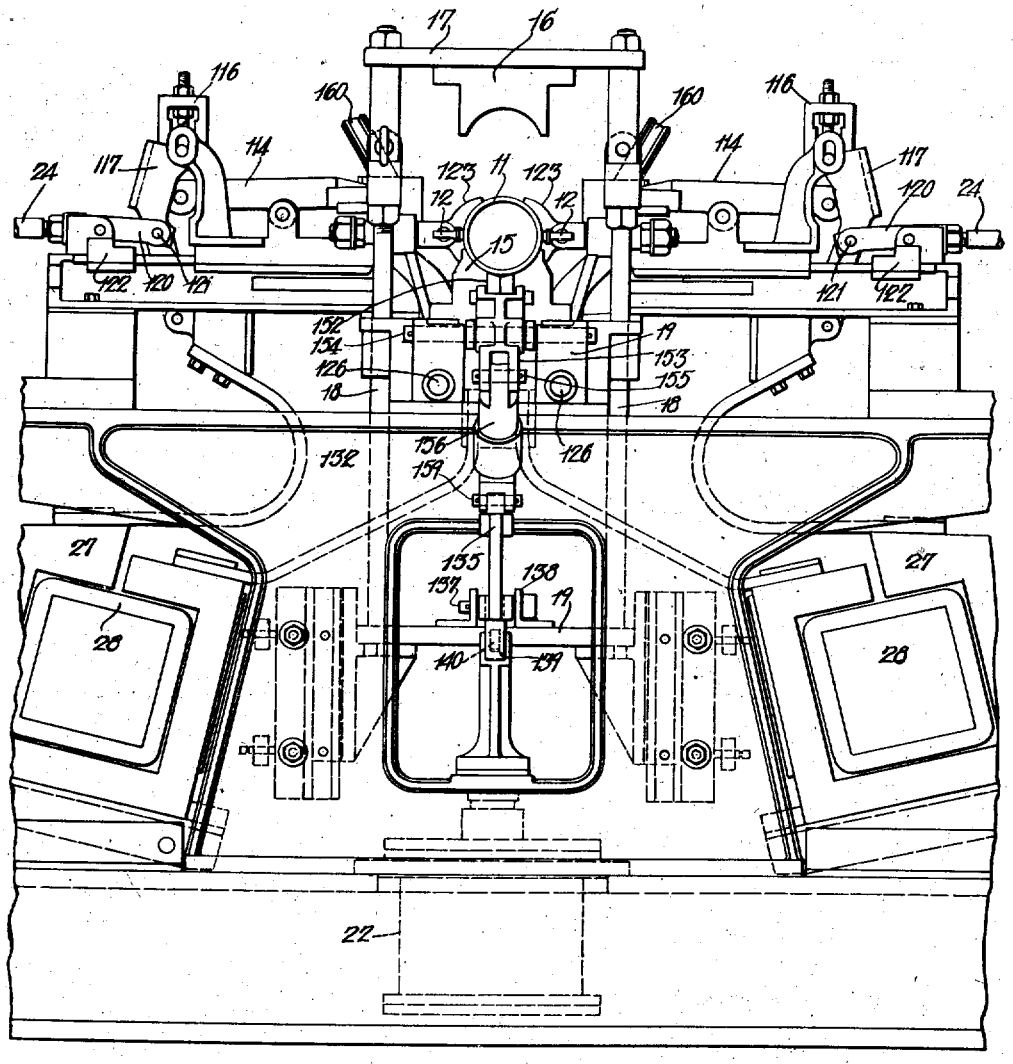
Figure 5:
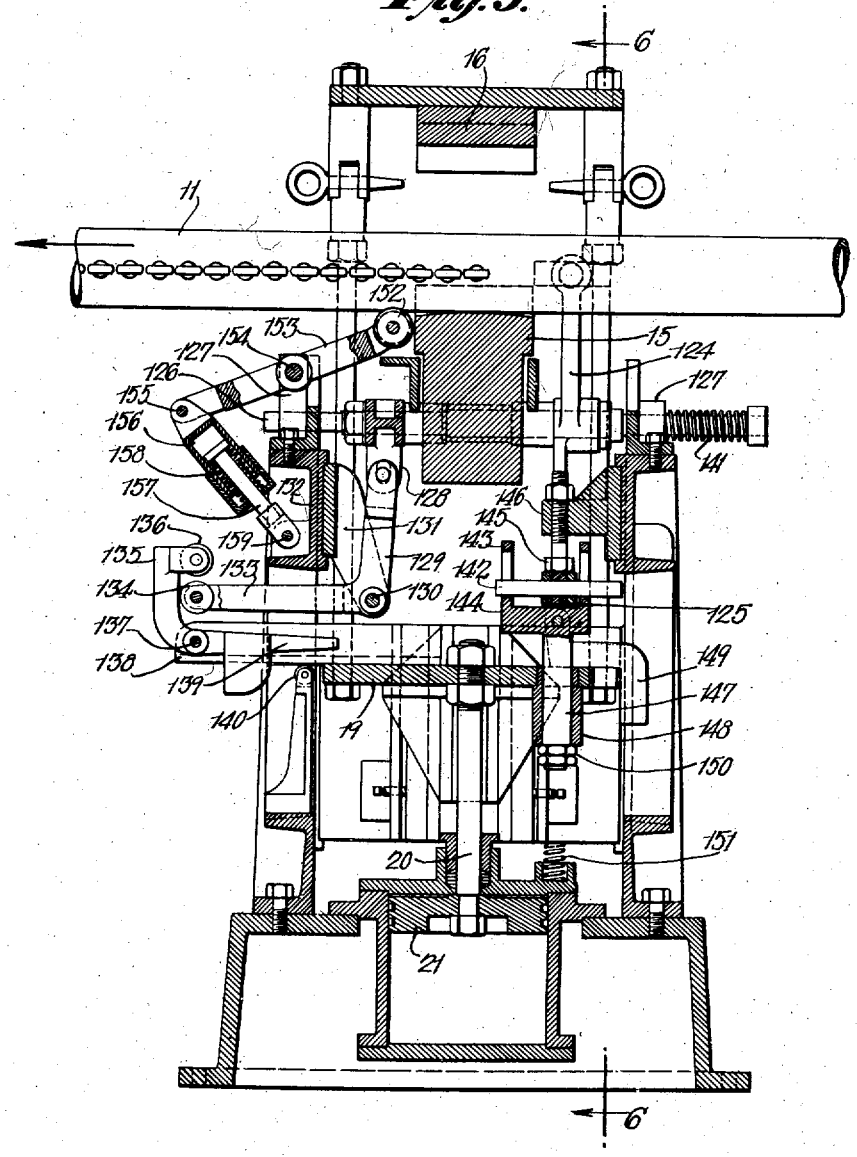
Figure 6:
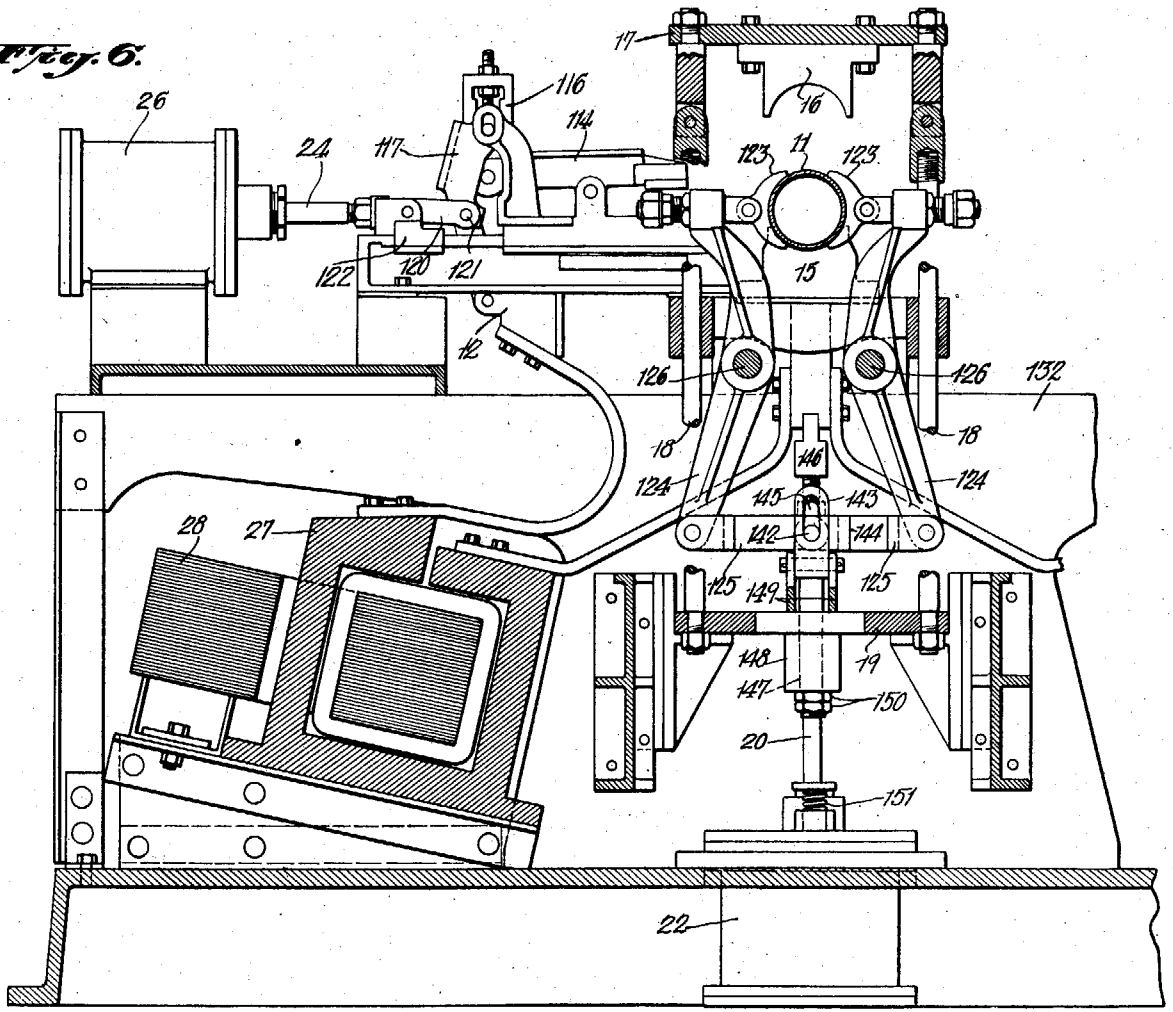
Figure 10:
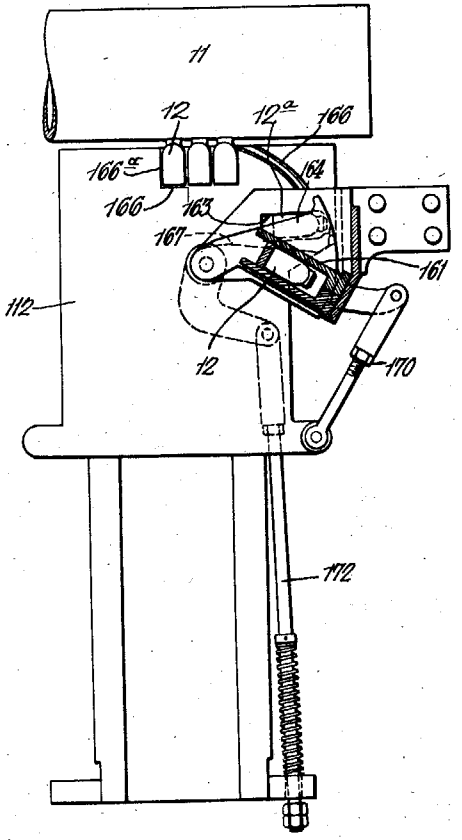
Figure 9:
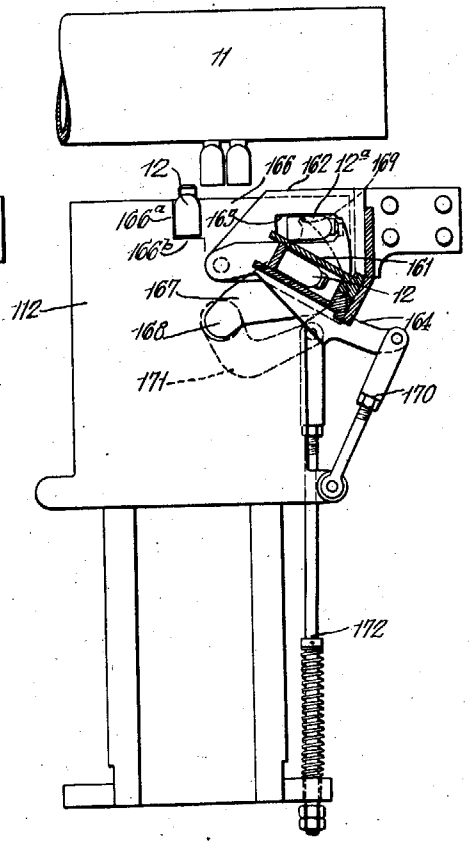
Figure 8:
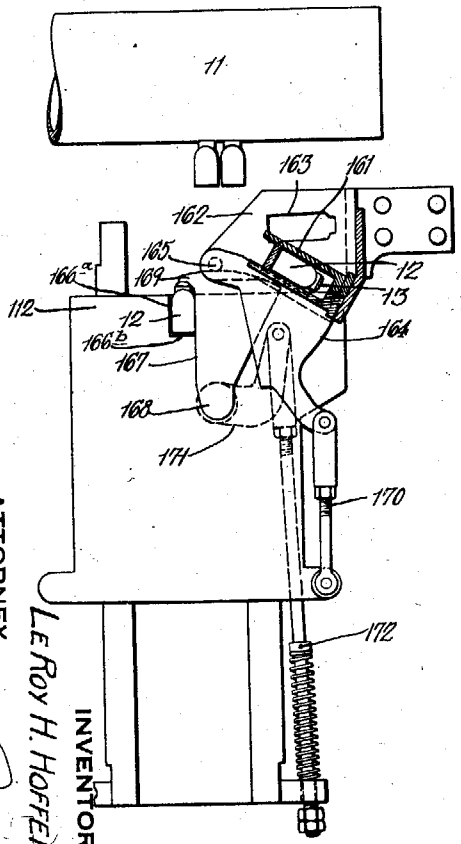

Fig. 1 is a perspective view of an end of a tube with the fins welded thereon; Fig. 2 is a half plan and half horizontal section of the machine; Fig. 3 is a half front elevation and half vertical section of the upper part of the machine; Fig. 4 is a front elevation omitting the devices at the sides which apply the attachments; Fig. 5 is a vertical transverse section of the same; Fig. 6 is a vertical section approximately on the line 6—6 of Fig. 5, illustrating the mechanism for clamping and advancing the tube; Fig. 7 is a similar view showing the opposite position of the clamps; Figs. 8, 9 and 10 are diagrams in plan of the mechanism for handling the attachments and applying them to the tube; Fig. 11 is a diagram of the pneumatic and electric circuits controlling the welding operation; Fig. 11a is an enlarged detail.

The tube rests on a lower electrode. When it is in position for a welding operation a clamping head is brought down on top of it holding it in position. Attachments are pressed against it at opposite sides with a comparatively light pressure. The circuit is then closed to pass a current across the joints for a certain period. The circuit is then broken and a comparatively high pressure forces the softened attachments against the tube to upset the work and complete the weld. The air cylinders are then reversed to release the welded attachments from their holders and withdraw the holders and to lift the clamping head from the work. At the top of the stroke of the clamping head the electrical contacts are made which cause a repetition of the previous operation. While the clamping head is lifted and the attachment holding electrodes are withdrawn, the tube is advanced a step so as to be in position to receive the next pair of attachments. In the apparatus illustrated this sequence of operations is automatic and the work can be done with exactness and rapidity. The attachments are also taken automatically in succession from magazines. The operations, however, need not be entirely automatic. One or more of them may be taken care of manually.

In the case illustrated, 11 is an ordinary welded or seamless boiler tube of three or four inches in diameter and may be from ten to thirty feet in length and of a wall thickness of about one quarter of an inch. The attachments 12 are fins about one quarter of an inch thick, three-eighths wide and one and a half inches long. Their inner ends are originally cylindrical and tapered (as shown for example at 13, Fig. 8) and are upset against the tube to form enlargements 14 (Fig. 1) at the joint. These fins in the case illustrated are spaced very close together, leaving only sufficient room for individual expansion and distortion in use.

The functions of the several parts will probably be clearer if I explain first the succession of operations through the control mechanism of Fig. 11. The tube 11 rests on a center electrode 15. It is clamped thereon by a clamping member 16 above carried by a crosshead 17 which is connected by pull rods 18 to a lower cross bar 19 on a piston rod 20 whose piston 21 moves vertically in a cylinder 22. Compressed air is admitted to the top or bottom of the cylinder for lowering or raising the upper clamping member. The electrode 15 and complementary member 16 have concave faces to engage the convex contour of the tube and embrace the latter between them during the welding operation.

The fins 12 are clamped as hereinafter explained in laterally movable electrodes indicated as a whole by the numeral 23 which are carried on the ends of piston rods 24 of pistons 25 moving laterally in cylinders 26. Compressed air is admitted to outer ends of the cylinders to press the fins against opposite sides of the tube, first with a reduced pressure and finally with an increased pressure.

When the fins are pressed lightly against the tube a welding current is passed by closing the circuit from the electrode 15 (which belongs in common to both sides) through the tubes to opposite fins 12 and thence to the secondary windings 27 of the opposite welding transformers 28. At the end of the operation the air pressure on the fins is increased to that desired for the upsetting operation after the cutting off of the current. The electrodes 23 are then unclamped from the fins and withdrawn by reversing the air pressure in their cylinders. The air pressure is then reversed in the lower cylinder to lift the upper clamp and permit the tube to be advanced lengthwise in position for the next pair of fins.

High pressure air (say about 100 pounds) is supplied to air pipe 29 through a main valve 30. A branch pipe 31 carries a pressure reducing valve 32 and maintains in the reservoir 33 a supply of air at the lighter pressure (say 15 or 20 pounds).

The air supply to the horizontal cylinders is controlled by valves 34, 35, 36, 37, 38 and 39; that to the vertical cylinder by valves 40, 41, 42 and 43. These valves work in one direction by springs and in the opposite direction by solenoids or similar electrical operating devices. Some of them are normally open (being closed by the solenoids) and others are normally closed (being opened by the solenoids). The normally open valves are indicated by the initials "N. O." and the normally closed valves by the initials "N. C.". The higher air pressure is applied to the horizontal cylinders only by the opening of the normally closed valves 46 and 47 as will be apparent from the arrangement of the piping. Check valves 48 and 49 are provided in order to prevent high pressure from backing up into the low pressure reservoir 33.

In setting the machine in operation the main air valve 30 is first opened. Then the main switches 50 and 51 of the electric circuits are closed. The main valve and switches are not changed until all the fins have been welded on a length of boiler tubing. All the operating cycles follow automatically.

The closing of the switch 50 causes a flow of current through the wires 52 and 53, coil 54, wires 55 and 56, contacts 57, 58, wires 59, 60, contacts 61, 62 and wire 63 to the opposite supply wire 64. The energizing of coil 54 closes the pairs of contacts 65, 66 and 67, 68. The closing of contacts 67, 68 provides an alternate pass or circuit for the current to flow through the coil 54 paralleling the circuit through the contacts 57 and 58; so that when the latter are opened the coil 54 will remain energized.

In a similar way the coil 69 is energized and controls the circuits through the valves of the welding head on the right hand side of the machine.

The closing of the contacts 65 and 66 closes the circuits through the solenoids of the valves 40, 41, 42 and 43. This opens the normally closed valves 40 and 43 so as to cause air to enter above the piston 21 and to exhaust below the piston; and closes the normally open valves 41 and 42. Thus the piston 21 is forced down, lowering the upper clamping member 16 on the work.

The contacts 57 and 58 tend to spring open, being held and closed by an arm 57a on the cross bar 19 which moves with the lower piston. In the initial downward movement of the piston, therefore, contacts 57 and 58 separate and the circuit through them is broken, the current flowing through the alternate pass provided by the contacts 67, 68 as above explained. At the right side there is a similar pair of contacts 57, 58 held closed at the top of the stroke by an arm 57a.

This arm 57a at the right carries a bar 70 pivoted at its left end and held up by a light spring and adapted near the end of its downward course to strike a contact 71 which cooperates with a contact 72. Near the end of its stroke the bar 70 closes the contacts 71, 72 for an instant and then passes by, allowing them to spring open again.

On its upward movement it springs past the contacts without effect. These contacts close the circuit through a coil 73 which closes two pairs of contacts 74, 75 and 76, 77. Contacts 76, 77 parallel the contacts 71, 72 and furnish a bypass for the current through the coil 73 to maintain the latter energized after opening of the first contacts 71, 72.

The closing of the contacts 74 and 75 closes the circuits through the solenoids of the valves 34, 35, 36, 37, 38 and 39. This opens the normally closed valves 34, 36 and 37 which allows low pressure air to enter the ports 78 and 79 at the rear ends of the cylinders 26 and to exhaust through the ports 80 and 81. The same circuits close the normally open valves 35, 38 and 39. The air, therefore, advances the pistons 25 and presses the fins 12 against the work with a comparatively light pressure.

The next step is to close the circuits through the transformers. Each of the electrodes 23 has fastened to its outer end a bar 82 which moves with the electrode and operates certain contacts. The bar 82 carries a spring retracted prong 83 which, on the advance movement, strikes a spring contact 84 and holds it closed momentarily against a mating contact 85, closing the circuit through a coil 86; the path of the current being from the main conductor 52 through wire 87, contacts 88, 89, wire 90, contacts 84, 85, wire 91, coil 86 and wires 92, 93 to the main conductor 64. The coil 86 closes the pairs of contacts 94, 95 and 96, 97. The circuit through 96, 97 parallels that through the contacts 84, 85 so that when the prong 83 passes these and permits them to separate, the circuit will be maintained through the coil 86. The closing of the contacts 94, 95 closes the circuits through the transformers.

The welding current continues until the take-up of metal at the joint has proceeded to a certain extent. The take-up is measured by the travel of the electrodes. The movement of the electrode carries with it the bar 82 which has a projection 98 adapted to strike the upturned end of a lever arm 99 pivoted at 100 and having a depending arm 101 which carries the contact 88. The swinging of the arm 101 to the left breaks the contact between 88 and 89. This breaks the circuit through the coil 86 and permits the opening of the contacts 94 and 95, which breaks the welding circuit.

After the welding current is discontinued the high upsetting pressure is to be exerted. As the arm 101 swings to the left it strikes the pin 102 of a whistle valve 46 and opens this high pressure valve. High pressure air then flows into the cylinder through the port 78, giving this electrode the final upsetting pressure. An identical operation is performed through valve 47 and port 79 at the right.

The next step is the reversing of the electrodes and restoring of the machine to its starting position. The movement of the arm 101 breaks the circuit through contacts 103 and 104 located at the lower end of the arm. This breaks the circuit through the coil 73 which causes the opening of the contacts 74 and 75, which breaks the circuit through the valves 34, 35, 36, 37, 38 and 39, causing a reversal of the movement of the pistons 25.

When these pistons have moved nearly to their full retracted position the trigger 60a opens the contacts 61, 62 at one side and a similar device opens the contacts 108, 109 at the other side; thus de-energizing the main coils 54 and 69.

The breaking of the circuit through these coils causes the opening of the contacts 65, 66 and 110, 111, which de-energizes the solenoids of the valves 40, 41, 42 and 43 and causes the upward movement of the piston 21 and the clamping head 16.

At the top of the stroke the arms 57a close the contacts 57, 58 and recommence the welding cycle.

The coil 105 at the right controls the right hand welding head and is controlled in the same way as the coil 86 which controls the left hand welding head. The reason for a separate control by each welding head is that one weld may be completed a fraction of a second ahead of the other. With the arrangement shown, the reversing movement of the pistons 25 cannot take place until both sets of contacts 103 and 104 at the left, and 106 and 107 at the right, have been opened by the full advance of the corresponding pistons 25 at the left and right.

The mechanism for clamping the fin in the electrode is shown chiefly in Figs. 2 and 3. The pins 12 are brought down one at a time from the magazine and shifted laterally to the positions shown in Figs. 2 and 3 resting on the electrode plate 112 carried on a holder 113. Pivoted on the holder is an arm 114 carrying at its forward end a clamping member 115 adapted to bear down on the pin 12. The rear end of the lever 114 is connected to a link 116 to which is adjustably connected the upper one of a pair of toggle arms 117 and 118. The arm 118 is pivoted to a downward extension 119 of the electrode holder. A link 120 has its forward end connected at 121 to the two toggle members and its rear end connected to a slide 122 which is actuated by the piston rod 24.

When the piston 25 moves inward, it first tends to straighten the toggle links 117, 118, which forces down the inner end of the clamping member 114 until the clamp 115 engages the fin 12. When the toggle links can move no farther, the continued movement of the piston advances the electrode carrier and electrode with the fin until the tapered end of the latter is pressed against the tube with the air pressure in the cylinder.

A reversing movement of the piston first breaks the toggle and unclamps the fin 12 after the latter has been welded to the tube and then withdraws the electrode carrier and leaves the electrode and clamp clear of the end of the pin, to permit the tube to be advanced another step. A new pin is then fed to the electrode as hereinafter described and the cycle repeated.

The downward movement of the clamping member 16, as previously described, holds the tube stationary during the welding operation. The withdrawal of the clamping member 16 takes place at about the same time as the withdrawal of the side electrodes.

The step by step advance of the tube between welding operations is accomplished by the following mechanism. The mechanism is actuated by the upward movement of the piston rod 20. When this rod is in its upper position (Fig. 6), the clamps 123 are firmly pressed against the tube by means of the levers 124 which are forced apart at their lower ends by the straightening out of the toggle links 125. The levers 124 are fixed on rods 126 which are free to turn and also to slide forward and backward in bearings 127 (Fig. 5) at the front and back of the machine.

When the piston 21 is lowered the toggles 125 are broken, the lower ends of the levers 124 are drawn inward and the clamps 123 withdrawn from the tube. The rods 126 carry depending arms 128 which have a pin and slot connection with arms 129 pivoted at 130 to a fixed bracket 131 on the frame 132 of the machine. The arm 129 is part of a bell crank lever whose other arm 133 extends forward and carries a friction roller 134 at its outer end. A tripping lever 135 has a roller 136 which in the raised position of the piston lies above the roller 134. The lever 135 is pivoted at 137 on a forwardly projecting bar 138 which is mounted on top of the cross bar 19 which is carried by the piston rod 20.

As the piston is lowered from the position of Fig. 5, the roller 136 strikes the roller 134 pressing down the arm 133 and swinging forward the arm 129 and the rods 126. The clamps at this time are in engagement with the tube so that the forward movement of the clamps carries the tube also one step forward.

The tripping lever has a counterweighted arm 139 which in the downward movement strikes a roller 140 mounted in a bracket on the front of the machine. This tilts the lever and allows the roller 136 to ride over the front of the roller 134, releasing the crank lever 133, 129 and ending the forward movement. The rods 126 and toggles and clamps carried thereby will return to their original position under the influence of the springs 141 at their rear ends.

In order that the clamps shall hold the tube during advancing movement, certain lost motion is provided between the piston rod and the toggles. For this purpose the pin 142 connecting the toggle links 125 rides in a slotted link 143 which is mounted in a bracket 144 which is raised by the cross bar 19.

Figs. 5 and 6 show the piston at the top of its stroke with the toggle links 125 striking against an adjustable stop 145 carried by a fixed cross bar 146 so as to regulate exactly the position of the clamps in their engagement with the tube.

It is desirable to disengage the two clamping rings when inserting a new tube. The raised position of the upper clamp 16 corresponds with the closed position of the side clamps 123. These must, therefore, be released. To effect this, the bracket 144 is mounted to slide vertically on the cross bar 19, the slide having a downwardly extending pin 147 sliding through a bearing 148 carried by the cross bar. A latch 149 is pivoted on the member 144 and is so shaped that in the position of Fig. 5 it holds the member 144 in an elevated position. When the latch 149 is pulled outward it drops the member 144 to the cross bar 19 and permits downward movement of the toggle pin 142 by the weight of the toggles and thus loosens the side clamps.

The lower end of the pin 147 carries nuts 150 engaging the lower end of the bearing 148 so as to transmit the movement of the latter to the block 144 and pull the latter down. In this movement there is first a lost motion in the slots of the loops 143, after which there is a direct pull down on the toggle pin to break the clamp. After the latch 149 has been withdrawn, the downward movement of the cross bar 19 will be accompanied by a downward movement of the block 144 until the projecting end of the pin 147 strikes the spring 151. This spring will hold the pin up as the downward movement of the piston continues until the block 144 is so high above the cross bar 19 that the latch 149 will drop again into operative position to start work again on a new tube.

Wear on the lower electrode 15 is saved by lifting the tube slightly when moving it forward. This is accomplished by mechanism shown in Figs. 4 and 5. In the clamped position shown in these figures, a roller 152 bears against the under side of the tube. It is carried at the end of a lever 153 pivoted at 154 to a bracket fixed on the frame. Its forward arm is connected by a pivot 155 to a link consisting of two members 156 and 157 which are drawn together under the pressure of a spring 158, the link 157 being pivoted at 159 also to a fixed part of the frame. A constant spring pressure is thus exerted on the under side of the tube. When the overhead clamp 16 bears down on the tube, the spring yields sufficiently to permit the clamping of the tube firmly on the lower electrode. When the overhead clamp is lifted the weight of the tube is carried to a large extent (or it may be entirely) by the spring and the sliding movement of the tube has practically no wearing effect on the lower electrode. The projecting ends of the tubes may be supported on any usual or suitable styles of support.

The fins may be fed to the electrodes by the mechanism illustrated in Figs. 8, 9 and 10. The fins are fed to chutes 160 (Figs. 2 and 3) at the bottom of which is a receptacle 161, Figs. 8, 9 and 10, in which a stack of several fins will lie in approximately horizontal positions. Below the receptacle by a space equal to the thickness of the rounded end of the fin is a stationary plate 162 with an opening 163 therein of approximately the contour of the fin. In a plane between the bottom of the receptacle 161 and the top of the plate 162 is a rocking member 164 pivoted at 165. When it swings from the position of Fig. 8 to that of Fig. 9, it pushes the lowermost fin 12 from the bottom of the stack over to the position 12a and drops it through the opening 163 on to the electrode 112 which is spaced below the plate 162 sufficiently to permit the passage of the fin.

The plate 112 has in its upper face a circular groove 166 in which the cylindrical part 13 of the fin travels, and has shoulders 166a and 166b for holding the fin in its final position on the plate.

On the plate 112 there is a flat arm 167 pivoted at 168 and having a forward flange 169 adapted to overlie the outer end of the fin.

The plate 164 is pivoted on the fixed plate 162 as explained and is connected by a link 170 with the slide 112 so as to advance and retract with the latter. The plate 167, however, is pivoted at 168 on the slide 112 and has an arm 171 which is connected by a link 172 to a fixed part of the frame in rear of the slide; so that as the slide advances the plate 167 swings backward and vice versa.

The three Figures 8, 9 and 10 show successive positions of advance. In the first position a fin 12 is held by the shoulders on the electrode plate and by the flange 169. As the electrode slides forward the plate 167 swings backward. In the intermediate position of Fig. 9 the plate 167 underlies the opening 163. By the same movement the plate 164 has been advanced to push a second fin 12a into the opening. The final advanced position is shown in Fig. 10 with the fin 12 in welding position. The plate 167 has been retracted so far as to permit the fin 12a to drop on the plate 112. In this position the plate 164 holds up the stack of fins in the receptacle 161.

Upon withdrawal of the slide, the plate 167 will carry the next fin 12a around to the position of Fig. 8 and hold it there. The plate 164 will at the same time be retracted so as to permit the lowermost fin in the receptacle to drop on to the plate 162 so that on the next advance the previous feeding operation will be repeated.

The attachments bear upon a small area of the tube and under a high pressure, particularly at the end of the welding operation, as explained above in connection with the operation of the welding heads. With tubes of fairly large diameter and thin walls, there is a tendency to indent the tubes under such pressure. The electrode 15 and top member 16 between which the tube is firmly clamped at the beginning of each welding operation in the zone or portion of its length to which the attachments are to be applied, give the tube strength to resist such local indentations. The clamping members press the tube in opposite vertical directions while the welding headers press the attachments against the tube in opposite lateral directions and the four points to which the pressure is applied are in the same zone or ring forming a short portion of the length of the tube.

What I claim is:—

1. A welding apparatus for applying a plurality of attachments along the length of a tubular work-piece, said apparatus comprising a central electrode adapted to receive the said work-piece, means to clamp the said work-piece thereto in a welding position and to release it at the end of a welding operation, a pair of opposite lateral electrodes, means to advance and retract said lateral electrodes toward and from said work-piece, means to dispose attachments in a position to be engaged by said lateral electrodes and pressed against said work-piece, a second clamping means for said work-piece, means to operate said second clamping means to grip the work-piece between welding operations, means to raise the work-piece from the said central electrode, and means to advance said second clamping means and the work-piece to a new welding position on said central electrode.

2. An electric resistance welding machine for applying attachments to a main work-piece including in combination means for welding said attachments in succession to the main work-piece, a clamp for holding the work-piece during the welding operations, a second clamping means for gripping the work-piece, mechanism for retracting the first clamp and operating the second clamping means to grip the work-piece between welding operations, and means for advancing said second clamping means and the work-piece.

3. An electric resistance welding machine for applying attachments to a main work-piece including in combination means for welding said attachments in succession to the main work-piece, a clamp for holding the work-piece during the welding operations, a second clamping means for gripping the work-piece, mechanism for retracting the first clamp and operating the second clamping means to grip the work-piece between welding operations, and means for advancing said second clamping means and the work-piece and a device for rendering inoperative the mechanism for operating said second clamping means.

4. A welding apparatus for applying a plurality of attachments along the length of a tubular work-piece at opposite sides in a single passage of the work-piece through the machine, said apparatus comprising a central electrode adapted to receive the said work-piece, means to clamp the said work-piece thereto in a welding position and to release it at the end of a welding operation, a pair of opposite lateral electrodes, means to advance and retract said lateral electrodes toward and from said work-piece, means to dispose attachments in a position to be engaged by said lateral electrodes and pressed against said work-piece, and means for advancing the work-piece between welding operations to a new welding position on said central electrode.

5. A welding apparatus for applying a plurality of attachments along the length of a tubular work-piece at opposite sides in a single passage of the work-piece through the machine, said apparatus comprising a central electrode adapted to receive the said work-piece, means to clamp the said work-piece thereto in a welding position and to release it at the end of a welding operation, a pair of opposite lateral electrodes, means to advance and retract said lateral electrodes toward and from said work piece, means to dispose attachments in a position to be engaged by said lateral electrodes and pressed against said work-piece and means for removing the work-piece from said central electrode and advancing it between welding operations to a new welding position thereon.

6. A welding apparatus for applying a plurality of attachments along the length of a tubular work-piece at opposite sides in a single passage of the work-piece through the machine, said apparatus including in combination a central electrode adapted to engage such a tubular work-piece, means to engage the work-piece at the opposite side and to clamp it on said electrode in successive welding positions, a pair of opposite lateral electrodes and means for advancing them toward the opposite sides of the work-piece while said work-piece is clamped on the central electrode so as to press such attachments against the opposite sides of said work-piece at points on its circumference intermediate between the central electrode and said clamping means, and mechanism for releasing said clamping means, withdrawing said lateral electrodes and advancing the work-piece between welding operations.

7. A welding apparatus for applying a plurality of attachments in two lines lengthwise along opposite sides of a tubular work-piece, said apparatus including in combination clamping devices shaped to engage the contour of such a tubular work-piece at opposite points along a short portion of its length and to embrace and hold such portion in shape during successive welding operations, means for advancing such attachments and welding them under pressure to the said portions of the tubular work-piece in successive operations in pairs at opposite sides between said clamping devices, and means for advancing the work-piece to bring successive portions thereof in register with said clamping devices and welding means.

8. A welding apparatus for applying a plurality of attachments in two lines lengthwise along opposite sides of a tubular work-piece, said apparatus including in combination welding heads for pressing attachments substantially simultaneously against opposite sides of the work-piece and passing a welding current while pressing the attachments against the work-piece and cutting off the current, said welding means being independently controlled for cutting off the welding current.

LE ROY H. HOFFER.